Sept. 1, 1964 C. O. BREITSPRECHER 3,146,790
SEQUENCE VALVE
Filed July 5, 1963 3 Sheets-Sheet 1
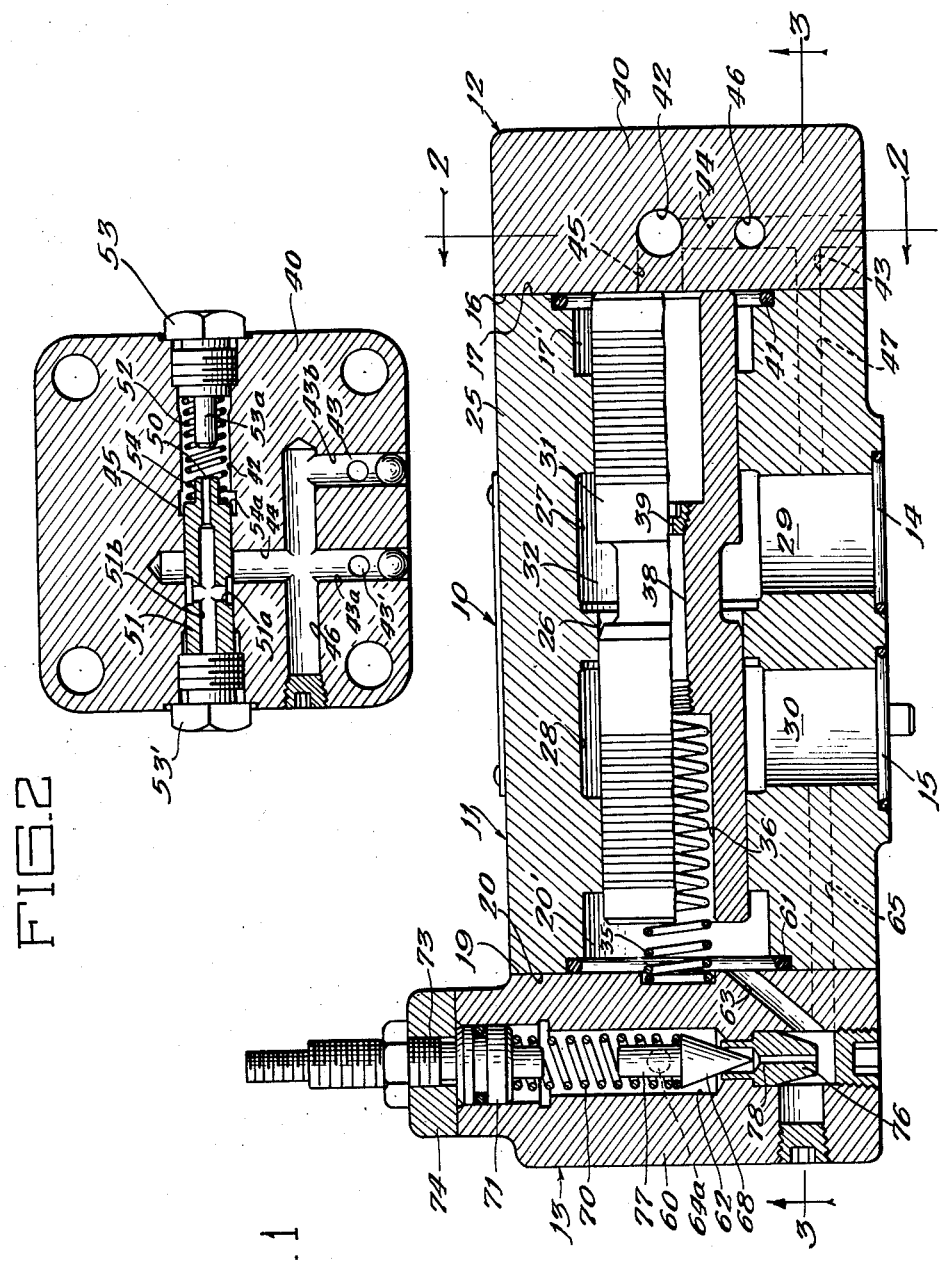
Inventor:
Charles O. Breitsprecher
By: Hofgren, Wegner, Allen,
Stellman & McCord
Attorneys

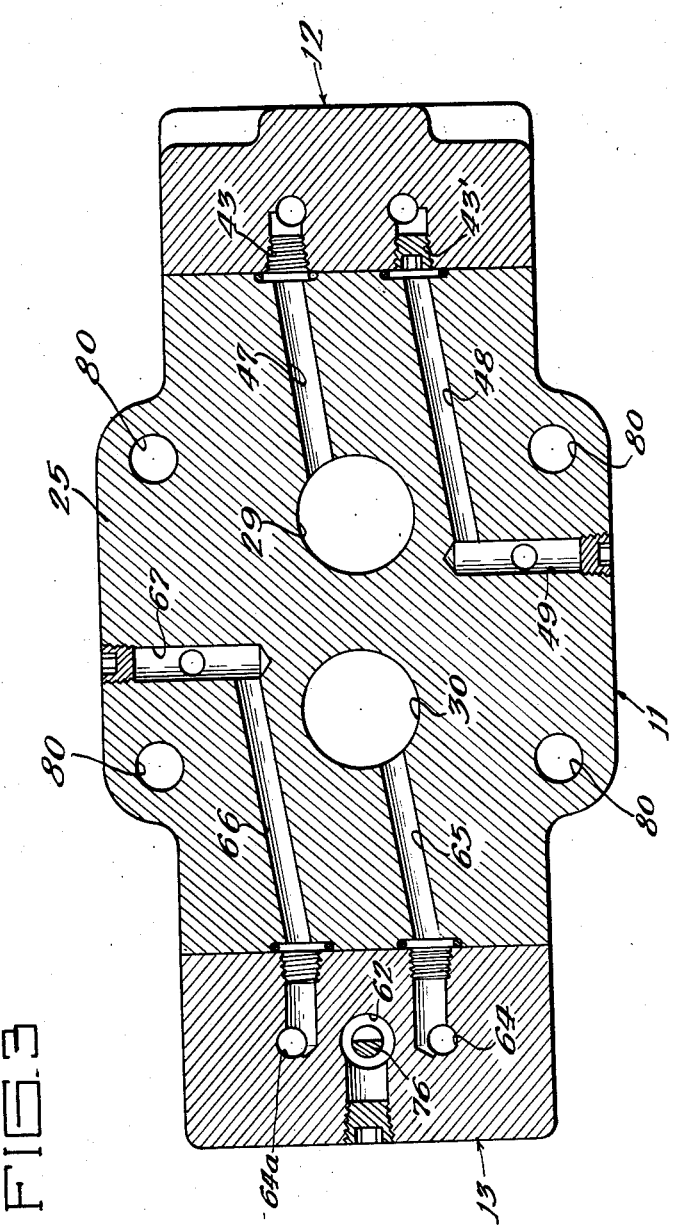

Sept. 1, 1964     C. O. BREITSPRECHER     3,146,790
SEQUENCE VALVE
Filed July 5, 1963     3 Sheets-Sheet 3
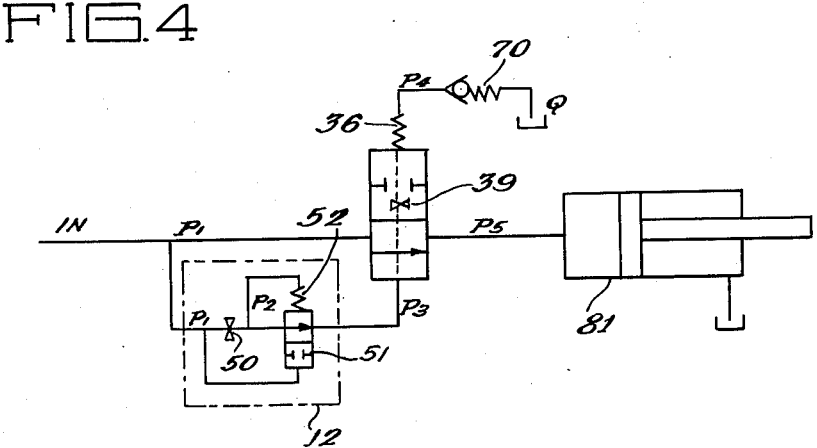
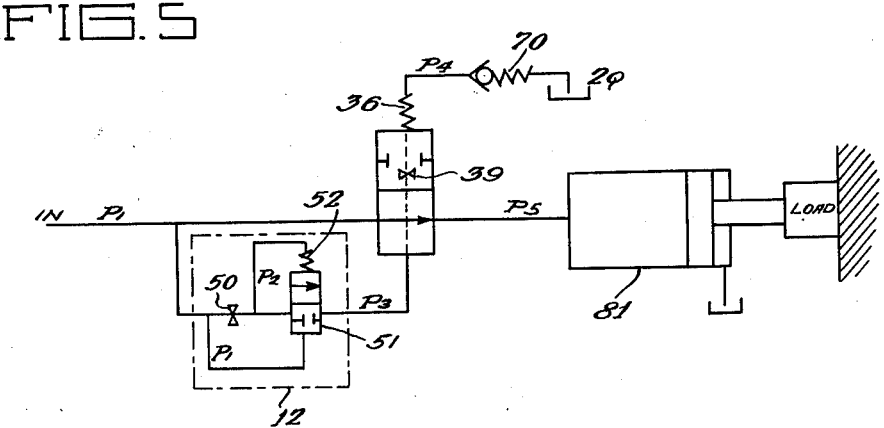

3,146,790
Patented Sept. 1, 1964

3,146,790
SEQUENCE VALVE
Charles O. Breitsprecher, Racine, Wis., assignor to Racine Hydraulics & Machinery, Inc., a corporation of Wisconsin
Filed July 5, 1963, Ser. No. 292,888
6 Claims. (Cl. 137—491)

This invention relates to a valve, and more particularly to a sequence valve with flow limiting control.

It is a primary object of the invention to provide a new and improved sequence valve.

Still another object is to provide a new and improved sequence valve which is actuated in response to a limited flow of control fluid.

A further object of the invention is to provide a sequence valve having a valve body with a main valve section for regulating the main flow of fluid, said main valve section being actuated in response to control fluid passing through a flow limiting valve section for limiting the quantity of control fluid required for actuating the main valve section. A related feature is the provision of a pilot valve section for preventing the flow of any control fluid until a minimum fluid pressure is reached.

Other objects and advantages will become readily apparent from the following detailed description taken in connection with the accompanying drawings, in which:

FIGURE 1 is a central sectional view of a valve embodying the principles of the present invention;

FIGURE 2 is a sectional view taken on the line 2—2 in FIGURE 1;

FIGURE 3 is a sectional view taken along the line 3—3 of FIGURE 1;

FIGURE 4 is a schematic diagram of the sequence valve in no load condition; and

FIGURE 5 is a schematic diagram of the sequence valve in full load condition.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

The invention is, in brief, directed to a sequence valve having a main valve section including a spool valve member received in a cylinder for controlling communication between a valve inlet and outlet. The spool valve member is constantly urged toward a first end of the cylinder and is actuated by means comprising a control fluid flow path in the valve whereby a small quantity of control fluid enters the first end of the cylinder and flows through a restricted orifice in the spool valve member to the other end of the cylinder to create a pressure differential between the cylinder ends when there is flow of control fluid through the cylinder responsive to opening of a pilot valve connected with the opposite end of the cylinder. The pilot valve is adjustable to open responsive to a predetermined pressure in the adjacent end of the cylinder. The flow rate of control fluid through the valve is regulated by a flow limiting valve section which is responsive to the pressure of the inlet fluid to throttle the quantity of control fluid entering the cylinder. This is particularly advantageous because the control fluid is tapped from the main body of fluid entering the valve inlet and as the inlet pressure increases the flow through the restricted orifice in the spool would otherwise increase to excessive amount.

Referring to the drawings, an integral valve body 10 has a main valve section 11 to which is secured a flow limiting valve section 12 and a pilot valve section 13, for regulating fluid flow between an inlet opening 14 and an outlet opening 15. More particularly, the flow limiting valve section 12 has an end surface 16 secured in abutting relationship with an end surface 17 of the main body valve section by suitable fasteners, such as bolts, not shown. Similarly, the pilot valve section 13 has an end surface 19 secured in abutting relationship with end surface 20 of the main valve section, as by bolts, not shown.

The main valve section 11 has a casing 25 including the end surfaces 17 and 20. A cylinder 26 within the casing 25 has opposite ends 17' and 20' opening through the end surfaces 17 and 20, respectively, and a cylindrical side surface with a pair of continuous peripheral recesses 27 and 28, connected respectively, by passage 29 with the inlet opening 14, and by passage 30 with the outlet opening 15. A spool-type valve member 31 is received in the cylinder 26 in substantially fluid tight sliding engagement with the side surface of the cylinder and is longitudinally movable between the opposite cylinder ends. A peripheral recess 32 in the spool 31 is longitudinally offset from the mid-portion of the spool, and in the normal closed position illustrated in FIGURE 1, communicates with the inlet recess 27 in the cylinder 26, but the outlet recess 28 is blocked by means in the form of the side surface of the valve member 31, thereby closing the main valve. The spool 31 is urged to one end 17' of the cylinder 26 by yieldable means in the form of a compression spring 35 received between a socket in the pilot valve end surface 19 and a socket 36 in the spool 31. The one cylinder end 17' communicates with the other or opposite cylinder end 20' through a longitudinally extending passage 38 in the spool and a restricted orifice 39 threadedly received in the spool in communication with the passage 38, thereby providing means for creating a pressure differential between the cylinder ends 17' and 20' when there is flow of control fluid from the cylinder end 17' to the cylinder end 20'.

The flow limiting valve section 12 has a casing 40 including the end surface 16 which abuts the end surface 17 of the main valve section casing 25. The end surface 16 has a portion overlying the open cylinder end 17' and is maintained in fluid tight engagement with the cylinder end by a suitable seal such as O-ring 41 clamped between the main valve casing 25 and end surface 16. The flow limiting valve section casing 40 has a hollow cylindrical cavity 42 with an inlet passage 44 communicating therewith and an outlet passage 45 opening through the overlying portion of the end surface 16 and into the main valve section cylinder end 17', providing means for directing fluid from the inlet passage to the cylinder end 17' to act against the force of spring 35. Inlet channels 43 and 43' are provided in casing 40, and communicate with passages 43a and 43b, respectively, which in turn communicate with a transverse passage 46. Passage 46 communicates with passage 44 so that two flow paths are established between inlets 43 and 43', and outlet 45. Means are provided for alternately connecting the inlet channels 43 and 43' with a source of control fluid under pressure, either the main body of fluid entering through inlet opening 14 by a passage 47 connected with the inlet port 43 and the passage 29 in the main valve section casing between the inlet opening 14 and the inlet recess 27, or by a passage 48 connected between the inlet port 43' and an auxiliary source of control fluid entering through a second inlet opening 49 in the main valve section casing 25 for remotely controlling the pressure control valve 10. Depending on the type of control desired, either passage 47 or 49 is plugged, as will be more fully described.

A piston 51 is slidably mounted in the hollow cylindrical cavity 42 and is provided with a transverse passage 51a communicating with a longitudinal passage 51b. A restricted orifice 50 is provided at one end of piston 51, the purpose of which will hereinafter become more fully apparent. Closure plugs 53 and 53′ are provided at opposed ends of cavity 42 with plug 53′ defining stop means against which piston 51 is seated in the normal position. The piston is urged into a normal position with transverse passage 51a partially overlying passage 44 by yieldable means in the form of a compression spring 52 received between closure plug 53 and a shoulder 54a, defined by a narrowed end portion 54 of the piston 51. The plug 53 has a stem 53a which may abut the end of piston portion 54 to limit movement of the piston 51 against the spring 52. In the normal position shown in FIGURE 2, shoulder 54a is disposed adjacent outlet port 45, so that as piston 51 moves axially in bore 42 away from seat 53′, piston 51 will overlie a greater portion of outlet port 45 to limit the control fluid flow rate through the outlet port 45, as will hereinafter become more fully apparent. Springs of various strength may be interchanged with spring 52 to vary the flow rate through the outlet port 44.

The pilot valve section 13 has a casing 60 including the end surface 19 abutting the main valve section surface 20. The pilot valve section surface 19 has a part overlying the open end 20′ of the main valve section cylinder 26. An O-ring 61 clamped between the main valve section casing 25 and the pilot valve section surface 19 provide a fluid tight closure therebetween. The pilot valve casing 60 has a chamber 62 connected by an inlet passage 63 opening through the overlying portion of the end surface 19 and communicating with the cylinder end 20′. There are two outlet openings 64 and 64a from the chamber 62. The outlet opening 64 is connected by a passage 65 opening into the passage 30 between the outlet opening 15 and the outlet recess 28 in the main valve section casing 25. The outlet 64a is connected with a passage 66 terminating in a second outlet opening 67 in the main valve section casing 11. Depending on the type of control desired, either passage 65 or passage 66 is plugged, as will be more fully described. The inlet passage 63 and the chamber 62 have therebetween a poppet valve member 68 normally urged closed against a valve seat at the chamber end of the inlet passage 63 by yieldable means in the form of a compression spring 70 seated between the top surface of the poppet valve member 68 and a stop member 71 which is slidably received in the chamber 62. The pressure in the inlet passage 63 required to open the poppet valve against the force of spring 70 may be adjusted by means of an adjusting screw 73 threadedly received in a cap 74 suitably secured to the pilot valve casing 60. A valve member 76 having a configuration to closely engage the wall of chamber 62 is provided with a passage 78 to allow the flow of control fluid through the member to actuate the poppet valve 68. Opening movement of the poppet valve is limited by a stem 77 which is adapted to abut the stop 71.

There are three different conditions that can exist in the circuit in which the sequence valve is placed. The first condition is when the sequence valve is not operating. The second condition is "no-load" operation, in which the motor in circuit with the sequence valve, such as a hydraulic cylinder 81, is being operated without any substantial resistance to movement, and the load requires less pressure than that at which the sequence valve is set to open. The third condition is "full-load" operation, in which the motor 81 is under "full-load" requirements, that is, maximum resistance, which is present when the load is as great or greater than the pressure at which the sequence valve is set to open.

In "no-load" operation (FIGURE 4), the flow limiting section 12 of the valve remains inoperative. There is control fluid flow in "no-load" condition and the pressure in chamber 20′ (P-4) is a constant determined by the setting of pilot valve spring 70. When the inlet pressure P-1 equals or is slightly in excess of the combined setting of pilot valve spring 70 and the sequence valve spring 36, there will be flow between inlet 14 and outlet 15 to prevent any further build-up in pressure at P-1 provided "no-load" conditions exist. Although defined as "no-load" operation, there will be a load due to internal resistances in the motor 81 and parts being moved by the motor. However, this load is substantially less than "full-load." Under these conditions, the sequence valve would function to modulate the flow from inlet 14 to outlet 15 and maintain a constant inlet pressure, P-1. This action takes place in the sequence valve because the pressure at cylinder end 17′ (P-3) minus the pressure at cylinder end 20′ (P-4) is maintained constant. This is obviously true because if P-3 were to become greater than P-4 plus the force of spring 36, spool 31 would open still further, which would result in a decrease in P-3, since P-3 is proportional to P-1. Conversely, if P-3 becomes less than P-4 plus the force of spring 36, the spool 31 would close and the pressure at P-1, and therefore P-3 would build up. This results in maintaining a constant control flow rate, so that the flow limiting section of the valve is not needed and remains inoperative during "no-load" operation of the valve.

In "full-load" operation (FIGURE 5), the pressure at P-5 can go to a much greater value than that existing in "no-load" operation, with this same pressure existing at P-1. In order to avoid a control flow through the valve to drain proportional to this pressure, the flow limiting device functions to limit the pressure differential across orifice 50 of the flow limiting section, so that the maximum control fluid flow is limited.

In the following example which typifies the "no-load" operation as shown in FIGURE 4, it should be understood that the pressures, and spring forces have been selected for purposes of illustration only, and are in no way meant to limit the invention to the values selected. Assuming a value of 500 p.s.i. for the pilot valve spring 70 and a value of 50 p.s.i. for the sequence valve spring 36, there must be a pressure of 550 p.s.i. at P-3 for the sequence valve to open. The flow limiting section is shown fully open and the spring 52 has a value of 20 p.s.i. with the orifice 50 being designed to provide a pressure drop of 20 p.s.i. at the maximum flow rate designed for the flow limiting section. Thus, with the normal flow rate Q being substantially less, such as approximately one-half the maximum flow rate, the pressure drop across the orifice 50 is less than the designed pressure drop of 20 p.s.i., and would be approximately in the range of 10 p.s.i. Thus, a pressure at P-1 of approximately 560 p.s.i. will result in a pressure at P-3 of 550 p.s.i., and the pressure in bore 42 (P-2) would be 550 p.s.i. Thus, with spring 52 having a value of 20 p.s.i., and the 550 p.s.i. in line P-2, the sum (570 p.s.i.) is greater than the pressure in line P-1 (560 p.s.i.), so that the valve member 51 of the flow limiting section remains fully open and the flow limiting device is not operative.

In "full-load" operation, the cylinder 81 is meeting maximum resistance and for purposes of illustration it may be assumed that this provides a pressure of 3,000 p.s.i. at P-5. Therefore, P-1 is also at approximately 3,000 p.s.i. With this value of P-1, in the absence of the flow limiting section, a great volume of fluid would flow through the sequence valve as control fluid. The flow limiting section functions to provide a predetermined maximum pressure differential which occurs when the control fluid flow is approximately twice the normal "no-load" flow. With the spring 52 having a setting of 20 p.s.i., the orifice 50 has a pressure drop of 20 p.s.i. at the maximum flow rate allowed by the flow limiting device. Thus, with a pressure of 3,000 p.s.i. at P-1, there is a 20 p.s.i. drop across the orifice 50, resulting in a pressure of 2,980 at P–2, which results in the valve 51 of the flow limiting section throttling the control fluid flow from the flow limiting section. The flow limiting valve throttling action functions to limit any additional control fluid flow which would normally occur whenever system pressure is above that at which the sequence valve is set to open.

The valve may be alternatively operated by a connection through the second inlet opening 49, with the passage 48 open and the passage 47 plugged, to provide a remote control arrangement for the valve. Preferably if the valve is to be controlled remotely the second outlet opening 67 would be connected to the control apparatus along with the second inlet opening 49 and the inlet passage 47 would be blocked in any suitable manner, as would the pilot valve outlet passage 65. Alternatively, if the valve is to be controlled automatically the passages 48 and 66 would be blocked and the passages 47 and 65 would be open.

Thus the valve is adjustably pilot controlled for operation over a wide range of pressures, and prevents flow of control fluid until opening of the valve is desired, and the maximum rate of flow of control fluid is limited by the integral flow limiting device. The valve is easily interchangeable in that it is of unitary construction, and in the embodiment illustrated need merely be bolted through holes 80 to a suitable manifold flange. Only the inlet opening 14, the outlet opening 15 and the pilot outlet 64 need be connected for automatic operation, or in the event that remote control is desired, the second inlet opening 49 and the second outlet opening 64 are also connected. The unitary construction of the assembly along with the construction and arrangement of the sections provides a valve having greater accuracy, stability, and reliability. The valve is fully adjustable and requires a minimum quantity of control oil.

I claim:

1. A sequence valve comprising: a central valve body having a central chamber with spaced inlet and outlet ports connected by passages to said chamber, said chamber also being open at both ends thereof, means movably disposed in said chamber and responsive to a pressure differential between the chamber ends to control flow between the inlet and outlet ports and in one position thereof blocking fluid flow between said inlet and outlet ports, means for directing fluid from the inlet port to one of said chamber ends and including a second chamber, a second inlet connected to said main body inlet port, a second outlet connected to said one chamber end, a valve member slidably mounted in said second chamber and having a passage permitting fluid flow therethrough, said valve member being movable to a position partially overlying said second outlet to throttle fluid through said second outlet, spring means urging said second valve member away from throttling relation with said second outlet, and a pilot relief valve connected to the other end of said central chamber.

2. A sequence valve comprising: a central valve body section having a central chamber with spaced inlet and outlet ports connected by passages to said chamber, said chamber also being open at both ends thereof, a valve member movably disposed in said chamber to control flow between the inlet and outlet ports with means in one position thereof for blocking fluid flow between said inlet and outlet ports, means for yieldably urging said valve member to said one position, a flow restricting orifice positioned to restrict flow from one end of the chamber to the other and create a pressure drop across the orifice, means for directing fluid from the inlet port to one of said chamber ends to act against the force of said yieldable means including a second valve body section, said second valve body section having a second chamber, a second inlet connected to said main body inlet port, a second outlet connected to said one chamber end, a second valve member slidably mounted in said second chamber and having an orifice therein permitting limited fluid flow therethrough and creating a pressure drop across the orifice, said second valve member being movable to a position partially overlying said second outlet to throttle the flow of fluid therethrough, spring means urging said second valve member away from throttling relation with said second outlet, and an openable valve connected to the other chamber end.

3. A sequence valve comprising: a central valve body having a central chamber with spaced inlet and outlet ports connected by passages to said chamber, said chamber also being open at both ends thereof, a hollow valve member movably disposed in said chamber to control flow between the inlet and outlet ports with means in one position thereof for blocking fluid flow between said inlet and outlet ports, means for yieldably urging said valve member to said one position, a flow restricting orifice positioned to restrict flow through the valve member from one end of the chamber to the other and create a pressure drop across the orifice when there is fluid flow, means for directing fluid from the inlet port to one of said chamber ends to act against the force of said yieldable means and including a second valve body abutting said first mentioned valve body, said second valve body having a second chamber, a second inlet connected to said main body inlet port, a second outlet connected to said one chamber end, a second valve member slidably mounted in said second chamber and having an orifice therein for limiting fluid flow therethrough and creating a pressure drop across the orifice, said second valve being movable to a position partially overlying said second outlet and throttling fluid flowing therethrough, spring means urging said second valve member away from throttling relation with said second outlet, and a pilot relief valve connected to the other end of said chamber.

4. A sequence valve, comprising: a valve body including a main valve section, a flow limiting valve section, a pilot valve section, and inlet and outlet openings; said main valve section including a chamber having opposite ends, ports opening into said chamber and connected through passages with said inlet and outlet openings, respectively, a valve member movably received in said chamber and movable responsive to a pressure differential between said chamber ends for either connecting said control ports for the passage of fluid therebetween or for blocking fluid flow therebetween, a flow-restricting orifice in said valve member for creating a pressure differential between said chamber ends, and means yieldably urging said valve member toward one of said chamber ends; said flow limiting valve section including a casing secured to said main valve section casing and having inlet and outlet control ports and a portion overlying said one chamber end, said outlet control port communicating with a passage opening through said overlying portion and into said one chamber end, means for connecting said inlet port with a source of fluid under pressure, and means responsive to fluid pressure in said inlet port for controlling and limiting the maximum rate of fluid flow through said outlet port and into said one chamber end; and said pilot valve section having a casing secured to said main valve section casing and a portion overlying the other of said chamber ends, the pilot casing having an inlet passage opening through the last said overlying portion and an outlet passage, and normally closed means connecting said inlet and outlet passage and opening responsive to a given fluid pressure in said other chamber end for fluid flow from said flow limiting valve section.

5. A sequence valve comprising: a valve body including a main valve section, a flow limiting valve section, a pilot valve section and inlet and outlet openings; said main valve section including a casing having a hollow cylinder, ports in the cylinder side wall connected through passages with said inlet and outlet openings, respectively, a valve member within said cylinder in fluid tight engagement with said side wall and movable between opposite cylinder ends, means yieldably urging said valve member toward one of said cylinder ends, a recess in said position connecting said control ports for the passage of fluid therebetween and closing at least one of said control ports to prevent the passage of fluid therebetween when said piston is, respectively, in opposite ends of said cylinder, a flow restricting orifice in said piston communicating with said cylinder ends for creating a pressure differential between said cylinder ends responsive to fluid flow therebetween; said flow limiting valve section including a casing secured to said main valve section casing and having a portion overlying said one cylinder end and a hollow cylinder with an inlet port and with an outlet port communicating with a passage opening through said overlying portion, means for connecting said inlet port with a source of fluid under pressure, a piston slidably mounted in the last said cylinder and having an orifice therein for creating a pressure differential between the ends of said last mentioned cylinder and limiting the flow of fluid therethrough, said piston being movable to an overlying relationship with said outlet port responsive to an increase in fluid pressure in said inlet port to limit the maximum fluid flow rate through said outlet port, and means yieldably urging the last said piston away from said outlet port; said pilot valve section being connected to the other cylinder end for controlling fluid flow through said main valve section.

6. A sequence valve comprising: a valve body including a main valve section, a flow limiting valve section, an inlet opening connected to a source of fluid under pressure and an outlet opening; said main valve section including a chamber having ends connected by a flow restricting orifice for creating a pressure differential between said chamber ends in response to fluid flow therebetween, and means responsive to different pressure differentials between said chamber ends for connecting and disconnecting said openings to control the passage of fluid therebetween; said flow limiting valve section having inlet and outlet ports, said outlet port being connected with one of said chamber ends and said inlet port with said source of fluid under pressure, and means responsive to fluid pressure in said inlet port for controlling the rate of fluid flow through said outlet port to said one chamber end; and a fluid outlet in the other chamber end, a pilot valve section, including a normally closed valve member associated with the fluid outlet in said other chamber end and responsive to a predetermined fluid pressure for establishing fluid flow through the valve.

References Cited in the file of this patent
UNITED STATES PATENTS

| | | |
|---|---|---|
| 2,198,487 | Sisk | Apr. 23, 1940 |
| 2,853,096 | Lee | Sept. 23, 1958 |
| 2,855,947 | Lee | Oct. 14, 1958 |
| 2,884,951 | Matthiesen | May 5, 1959 |
| 3,101,738 | Horlacher | Aug. 27, 1963 |